United States Patent [19]

Haack

[11] Patent Number: 5,362,185
[45] Date of Patent: Nov. 8, 1994

[54] DEVICE FOR POSITIONING COMPONENTS

[75] Inventor: Johannes Haack, Studen, Switzerland

[73] Assignee: Connex AG, Reiden, Switzerland

[21] Appl. No.: 952,630

[22] PCT Filed: Mar. 18, 1992

[86] PCT No.: PCT/EP92/00589

§ 371 Date: Jan. 8, 1993

§ 102(e) Date: Jan. 8, 1993

[87] PCT Pub. No.: WO92/16759

PCT Pub. Date: Oct. 1, 1992

[30] Foreign Application Priority Data

Mar. 23, 1991 [DE] Germany ............... 9103621[U]

[51] Int. Cl.[5] ........................... F16B 13/04
[52] U.S. Cl. .............................. 411/34; 411/60; 411/324
[58] Field of Search ............ 411/24, 25, 26, 27, 411/389, 393, 395, 292, 325, 305, 306, 178, 301, 302, 333, 324, 60, 276, 354

[56] References Cited

U.S. PATENT DOCUMENTS

| 1,220,024 | 3/1917 | Tanzi | 411/393 |
| 3,042,094 | 7/1962 | Liljeberg | 411/389 X |
| 5,244,323 | 9/1993 | Tucchio | 411/393 X |

FOREIGN PATENT DOCUMENTS

| 940257 | 3/1956 | Germany | 411/325 |
| 388131 | 2/1933 | United Kingdom | 411/26 |
| 800502 | 8/1958 | United Kingdom | 411/60 |

Primary Examiner—Rodney M. Lindsey
Attorney, Agent, or Firm—Max Fogiel

[57] ABSTRACT

An arrangement for positioning components such as die or mold plates in shaping machinery, in which a positioning element is inserted into matching bores in the components to be positioned. The positioning element or device is provided with a cylindrical jacket around an axial bore and a continuous through-going slot. An elastic rod is inserted into the axial bore and is subjected to force from at least one end, for the purpose of increasing the thickness of the elastic rod and widening the cylindrical jacket so as to position the component. The components have, thereby, an elastic connection through the elastic rod. The continuous through-running slot provides elasticity by widening in accordance with the force that is applied.

5 Claims, 9 Drawing Sheets

DEVICE FOR POSITIONING COMPONENTS

BACKGROUND OF THE INVENTION

The invention concerns a device used for positioning components, like those of the die or mold plates employed in shaping machinery, capable of being inserted in matching bores in or through the components, and comprising a cylindrical jacket around an axial bore and provided with a continuous slot.

In many applications it is necessary to position two components together. This is especially true of the die or mold plates employed in shaping machinery for precision blank cutting, punching, or compression molding. Such a plate can be composed of several components, each of which dictates part of the shape. It will be obvious that such components must be positioned together very precisely.

Positioning can be essentially either permanent or temporary. In the former the components remain together and in the second they are taken apart again after a while.

The devices employed for positioning such components up to now have been cylindrical or conical bolts and tension and expansion bolts of the type specified with reference to the drawing.

It should in particular be possible to remove and reuse the positioning devices employed with take-apart components. The devices must in this event be protected from the sort of damage that results from accidental fusion when a device is forced into a matching bore. The bores in the components must of course also be protected from the damage that occurs when the outside diameter of the device is longer than the inside diameter of the bore.

SUMMARY OF THE INVENTION

The object of the present invention is to improve a device of the aforesaid type to the extent that it will allow greater tolerance between its outside diameter and the inside diameter of the bores and the distances between them such that neither the device itself nor the bores will be damaged and whereby the device can be extracted from the bore without damaging the latter.

This object is attained in accordance with the invention with a resilient rod in the axial bore that can be subjected to force from one or both ends.

The force, especially from both ends, will vary the diameter of the rod and apply force to the cylindrical jacket, causing it to expand within the bore for example into frictional or interlocking engagement with the inner surface of the bore.

The force can be applied by closing off one end of the device and screwing a compression screw in from the other end. Thus, at least one compression screw will be accessible from outside even in a blind bore, and it can be screwed into the axial bore with an inside-hexagonal wrench once the device has been inserted into the bore, applying force to the resilient rod and expanding the cylindrical jacket.

A device of this type is also very easy to disengage just by eliminating the force on the rod to allow the device to return to its original shape, after which it will drop out of the bore.

A device of this type will preferably be made of a hard material, although other materials are also conceivable because the frictional or interlocking engagement does not occur until the device is in the bore and there will accordingly be no accidental fusion between the materials.

Whether the components are o a soft or a hard material makes no difference.

It should be emphasized in particular that this device has all the advantages of the previously known very expensive expanding bolt while being particularly cost-effective to manufacture. The device can be inserted manually and secured with an ordinary tool, an inside-hexagonal wrench for example. Its application is universal. The tolerances such a device allows are extraordinarily liberal.

The cylindrical jacket in one preferred embodiment of the invention has a bezel at the edge that merges into a flat face. The bezel and flat face particularly facilitate inserting the device into a matching bore. The bezel slants down from the edge of the bore, narrowing the aforesaid slot and allowing a device with a considerable diameter to be inserted into a matching bore with a prescribed inside diameter. The device can be forced in with an ordinary arbor, constituting a shoulder for the flat face to rest against.

Independently of the shape of the flat face, although preferably in conjunction with it and with the characteristic recited in claim 1, the slot in another embodiment of the device can have at least rounded-off outer edges. The rounded-off outer edges of the slot, which can in this event by straight, helical, or undulating, prevent particles from being abraded off the walls when the device is forced into a matching bore. This is a considerable advantage in terms of both forcing the device into and extracting it out of the bore. Both outer edges of the slot should accordingly be rounded off.

BRIEF DESCRIPTION OF THE DRAWINGS

Further advantages, characteristics, and details of the invention will be evident from the following description and from the drawing, wherein FIG. 10 is a transverse section through two components and a device for positioning them with a tool for forcing the device in.

DESCRIPTION OF THE PREFERRED EMBODIMENTS

Figure 1:
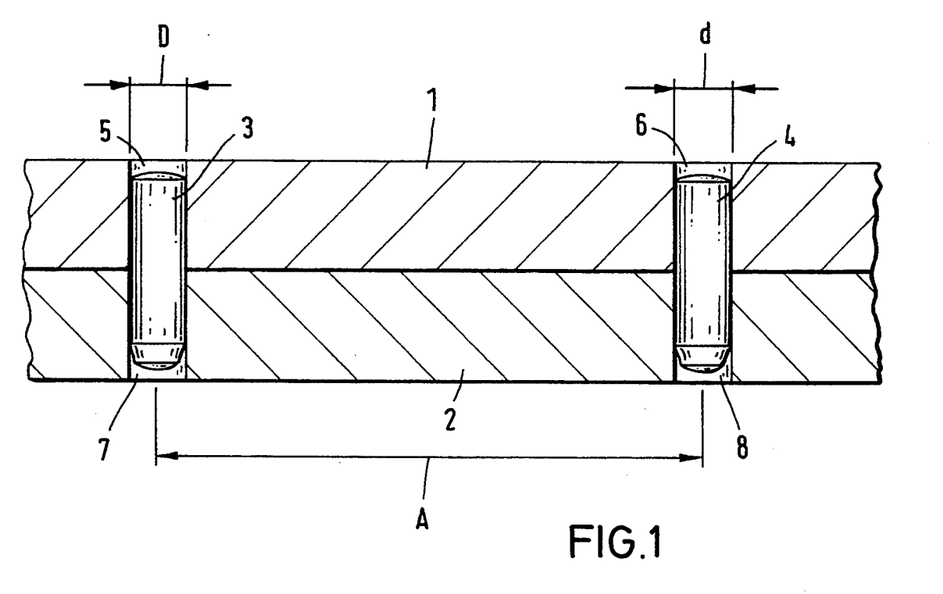
FIG. 1 is a transverse section through two components positioned by two cylindrical bolts.

The two components 1 and 2, die or mold plates for example, illustrated in FIG. 1 are secured together by cylindrical pins 3 and 4 accommodated in matching bores 5 & 7 and 6 & 8 in components 1 and 2. It will be evident that precise fit and hence narrow tolerances with respect to the outside diameter d of pins 3 and 4 and to the inside diameter D of bores 5 & 7 and 6 & 8 will be necessary to precisely position the components. Also necessary is a precise tolerance with respect to the distance A between bores 5 & 7 and 6 & 8. The precision is higher than ISO Standard 7 (German Industry Standard) and is specifically $$D = 10^{H7} \quad 10 = {}^{+0.015}_{-0}$$
$$d = 10_{m6} \quad 10 = {}^{+0.015}_{+0.006}$$
$$A = 100 \, JT5 \quad 100 = \pm 0.0075$$

Standardized cylindrical pins 3 and with a diameter d of 10 mm will accordingly have a tolerance of 9 μm, the bores a tolerance of 15 μm and distance A, 100 mm, a tolerance of 15 μm.

From these tolerances it will be evident that the pin can have a positive play of no more than 9 μm. This means, however, that it will rest loosely in bores 5 & 7 and 6 & 8 and can drop out.

The pin can on the other hand have a negative play, or interference, of 15 μm in relation to bores 5 & 7 and 6 & 8 and will accordingly fit tight, although such a fit will lead to fusion of the materials while pins 3 and 4 are being forced in and hence to damage to either the pins or the bores. It is impossible to remove such a pin.

From additional consideration of the tolerance for the distance A between bores 5 & 7 and 6 & 8, the practical or complete impossibility of positioning the components with conventional pins 3 and 4 such that they can be removed will be evident.

Figure 2:
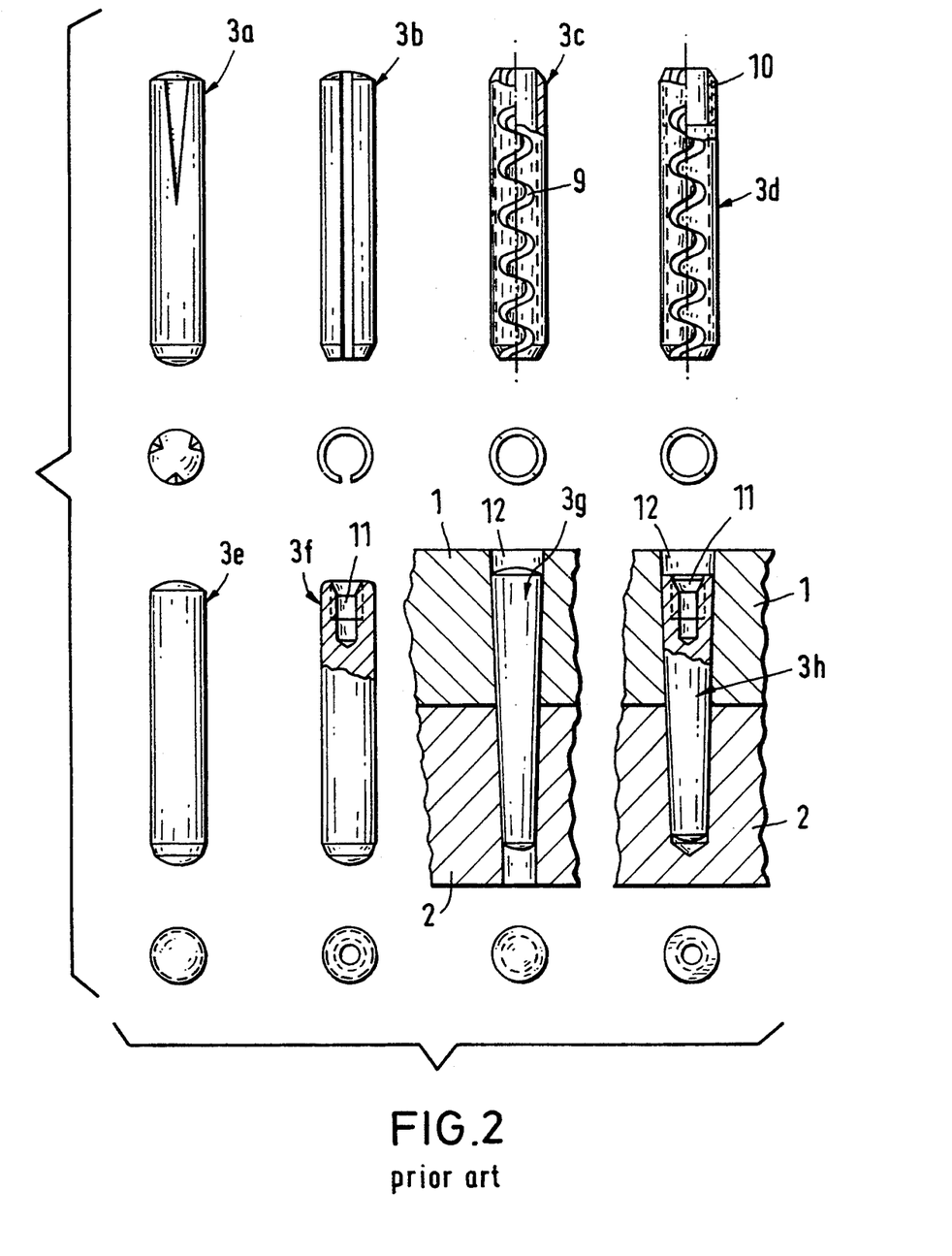
FIG. 2 is an overall view of bolts, illustrated partly in transverse section and partly ready to use, for positioning component at the state of the art, FIG. 2a an embodiment of an expanding pin with a plurality of slots.

FIG. 2 is an overall view of known pins that, although they solve some problems, regularly generate other problems of their own. Grooved pin 3a can be employed only to permanently position components 1 and 2. It is generally hammered into soft components and tends to fuse with them.

Tensioning pin 3b can also be employed only to permanently position two components, but can be employed with both hard and soft materials. The pin itself will accordingly be made of a hard or soft material.

Tensioning pin 3c has an undulating slot 9 and can be employed for both permanently and temporarily positioning components 1 and 2. The materials can be either hard or soft, whereas the pin itself is hard. The pin can be reused after use in hard materials only to a limited extent because it sustains damage while being driven in. The edges of slot 9 also chip particles off while it is being driven in which damages bores 5 & 7 and 6 & 8.

Pin 3d is similar to pin 3c, although it has an inside thread 10 beginning at the face, which accommodates a means of extracting it.

Pin 3e is a simple cylinder that can be made of hard or soft material. When a hard pin of this type is pounded into a hard component, the result is either fusion or only a loose fit. When such a hard pin is forced into a soft component, it will fuse into the bores. If the pin is soft and the component hard, the pin will also fuse. This means that pins 3e can be re-used only to a limited extent, with considerable manufacturing problems due to the strict tolerances involved.

Pin 3f differs from pin Be only in its threaded blind hole 11 that accommodates a matching means of extracting cylindrical pin 3f from one a bore 5, 7, 6 or 8.

Conical pin 3g will only fit matching conical holes 12 in components 1 and 2. This means that the holes for two component must be created simultaneously and not independent. Such a conical pin can be of either hard or soft material and can be reused with either hard or soft components.

Conical pin 3h has, unlike conical pin 3g, a threaded blind hole 11 used *to remove the pin from its matching conical hole 12.

Figure 2A:
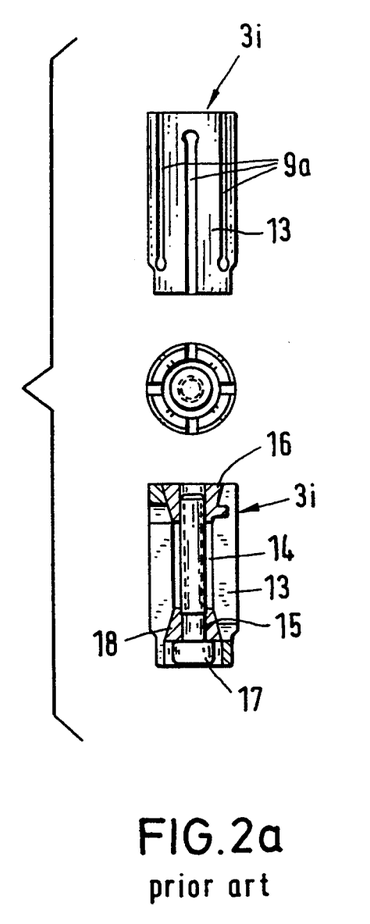

FIG. 2a illustrates an expanding pin 3i. Expanding pin 3i has slots 9a at each end that allow the surface 13 of the pin to expand. The pin is expanded by screwing a bolt 15 into a longitudinal bore 14 in it. The end of bolt 15 engages a slide-over cone 16, and a slide-over sleeve 18 is mounted at the other end below a screw head 17. As threaded bolt 15 tightens it forces cone 16 and sleeve 18 together, expanding surface 13 at that point.

It is of course also possible for cone 16 to be stationary and for sleeve 18 to be forced toward it.

Such an expanding pin can be used and optimally reused with both hard and soft components. It also allows precise positioning. Its drawback is the extremely high expense dictated by the manufacture and assembly of so many parts.

Figure 3:
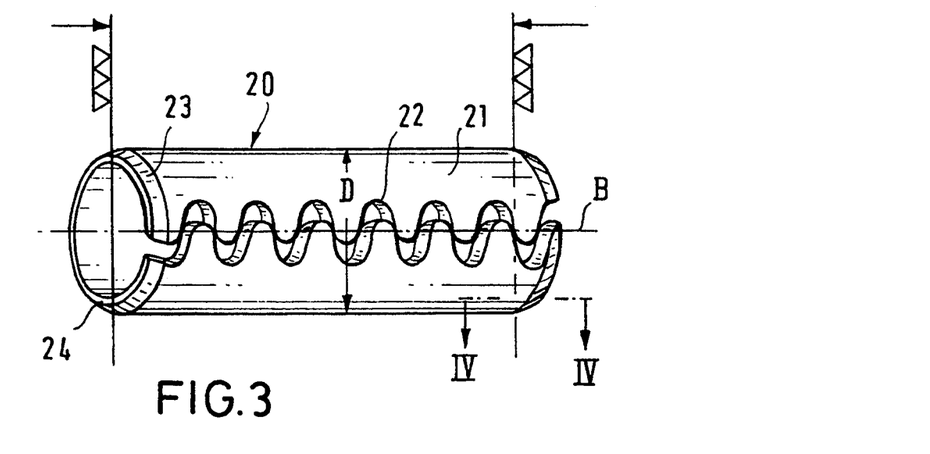
FIG. 3 is a perspective view of a positioning element with an undulating slot.
Figure 4:
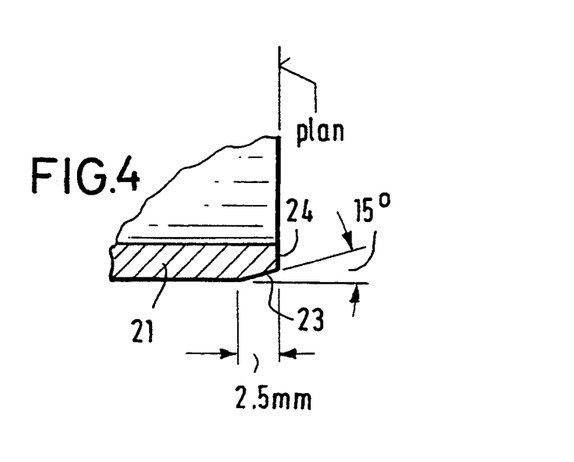
FIG. 4 is a longitudinal section through part of the device in FIG. 3 along the line IV—IV.
Figure 5:
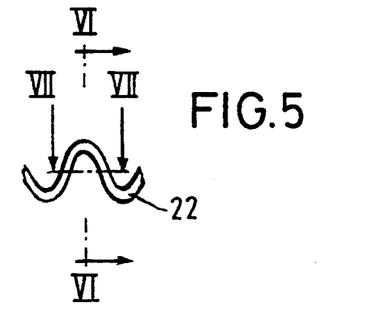
FIG. 5 is a top view of part of the device illustrated in FIG. 3.
Figure 6:
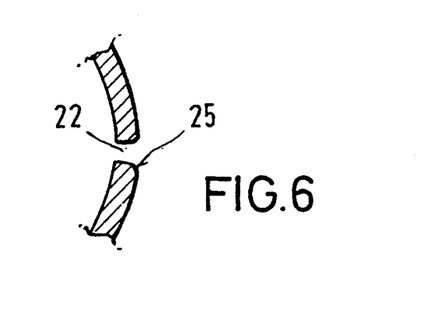
FIG. 6 is a transverse section along the line VI—VI in FIG. 5 through part of the device illustrated in FIG. 3.
Figure 7:
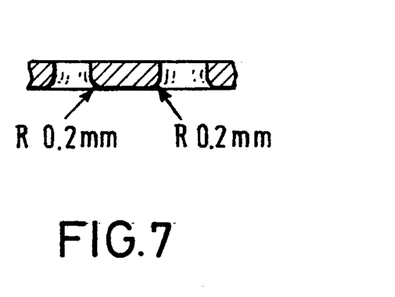
FIG. 7 is a longitudinal section along the line VII—VII in FIG. 5 through part of the device illustrated in FIG. 3.

An device 20 in accordance with the present invention for positioning components is illustrated in FIG. 3. It is similar to pins 3c and 3d. It essentially comprises a cylindrical jacket 21 with a slot, preferably an undulating slot 22, paralleling its longitudinal axis B. It differs essentially from the known tensioning pins, however, in the following characteristics:

a) Device 20 has a bezel 23 of 15° on the edge at each end, approximately 2.5 mm at an outside diameter D of 10 mm. In contrast to the known pins, each bezel 23 terminates in a flat-ground face 24, which particularly facilitates the application of a driving tool.

b) As will be evident in particular from FIGS. 5 through 7, the outer edges 25 of slot 22 are rounded off to a radius R (approximately 0.2 mm). No material will be abraded off when a device 20 is inserted into matching bores 5 & 7 and 6 & 8, even when the device is made of a hard material and components 1 and 2 of a soft material.

c) Device 20 will preferably have Rockwell hardness C HRC=58+2. Known tensioning pins are substantially softer.

A device of this type is can not only be employed to position components of any material at all but can also be reused at any time.

To ensure a tight fit in bores 5 & 7 and 6 & 8, the bores must have a diameter tolerance of H 9, meaning $$10 \begin{array}{c} +0.36 \\ -0. \end{array}$$

The tolerance for distance A will now be JT 8, meaning $$100 \begin{array}{c} +0.027 \\ -0.027 \end{array}.$$

Figure 8:
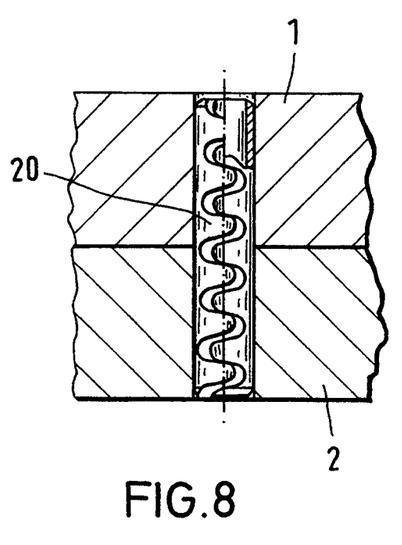
FIG. 8 is a larger-scale transverse section through two components with a device, illustrated partly in section, for positioning them for use.
Figure 9:
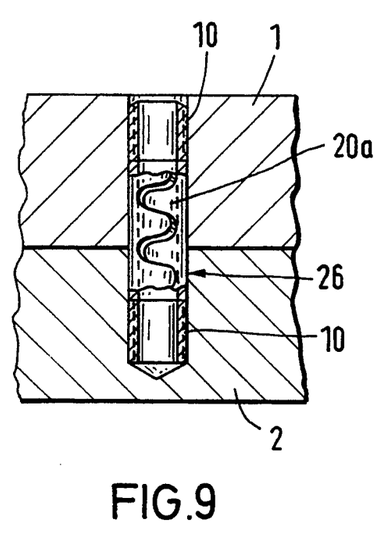
FIG. 9 is a transverse section through two components with another embodiment, illustrated partly in section, of a device for positioning the components ready for use.

Device 20 can, as will be evident from FIGS. 8 and 9, be inserted in bores that go all the way through or part-way through. When there is a hole 26 part-way through components 1 and 2, device 20a will preferably have an inside thread 10 at each end to accommodate the means of extracting it that will be specified hereinafter. When there is a thread at each end, the user will not have to be careful about how he inserts device 20 into hole 26.

Figure 10:
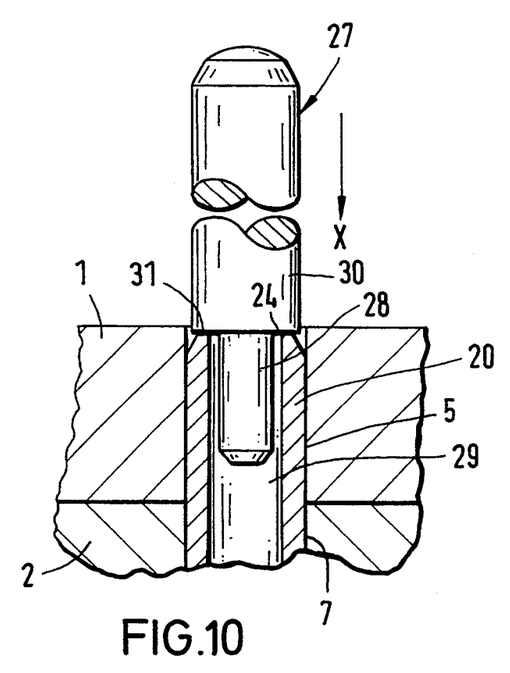

Device 20 is inserted with an arbor 27 and a plug 28. Plug 28 engages in its operating position an axial bore 29 in device 20, whereby a shoulder 31 comprised of a setting bolt 30 and plug 28 rests flat against face 24. Arbor 27 can be forced with a hammer or similar tool in direction x and driven along with device 20 into the matching bore 5 or 7 in component 1 or 2.

The device is removed from a continuous bore 5, 6, 7, or 8 simply by inserting arbor 27 into device 20 again from the other end and hammering it out opposite direction x.

Figure 11:
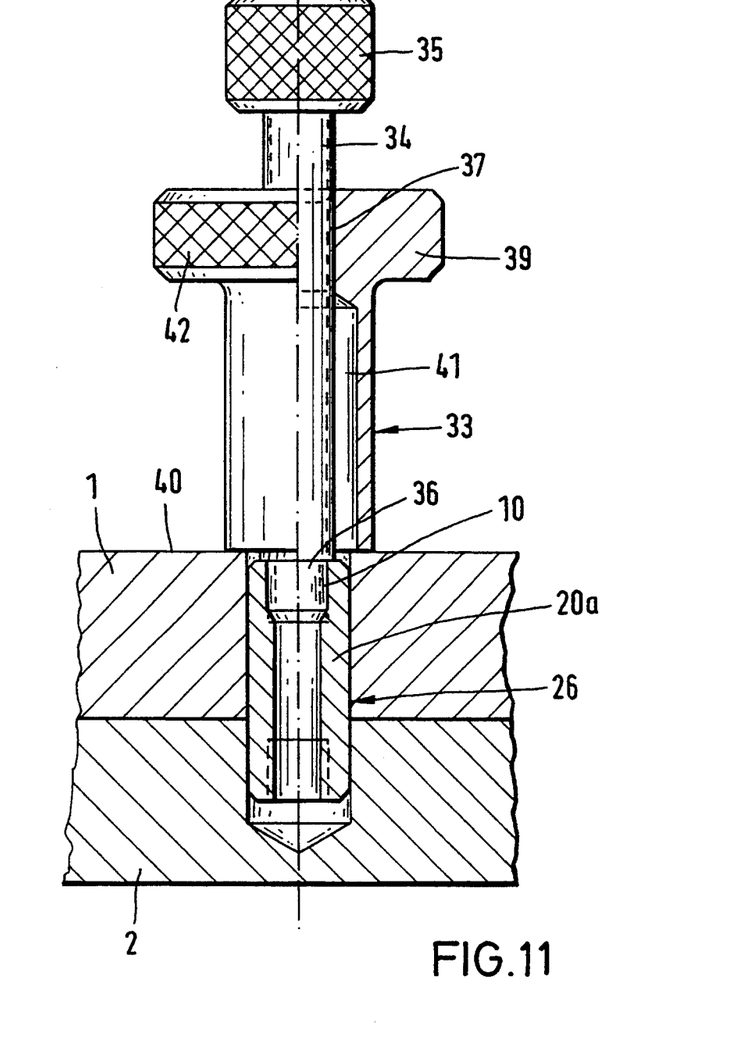
FIG. 11 is a transverse section through part of two components connected by another embodiment of a device in accordance with the invention for positioning the components and associated with a means of removing the device.
Figure 12:
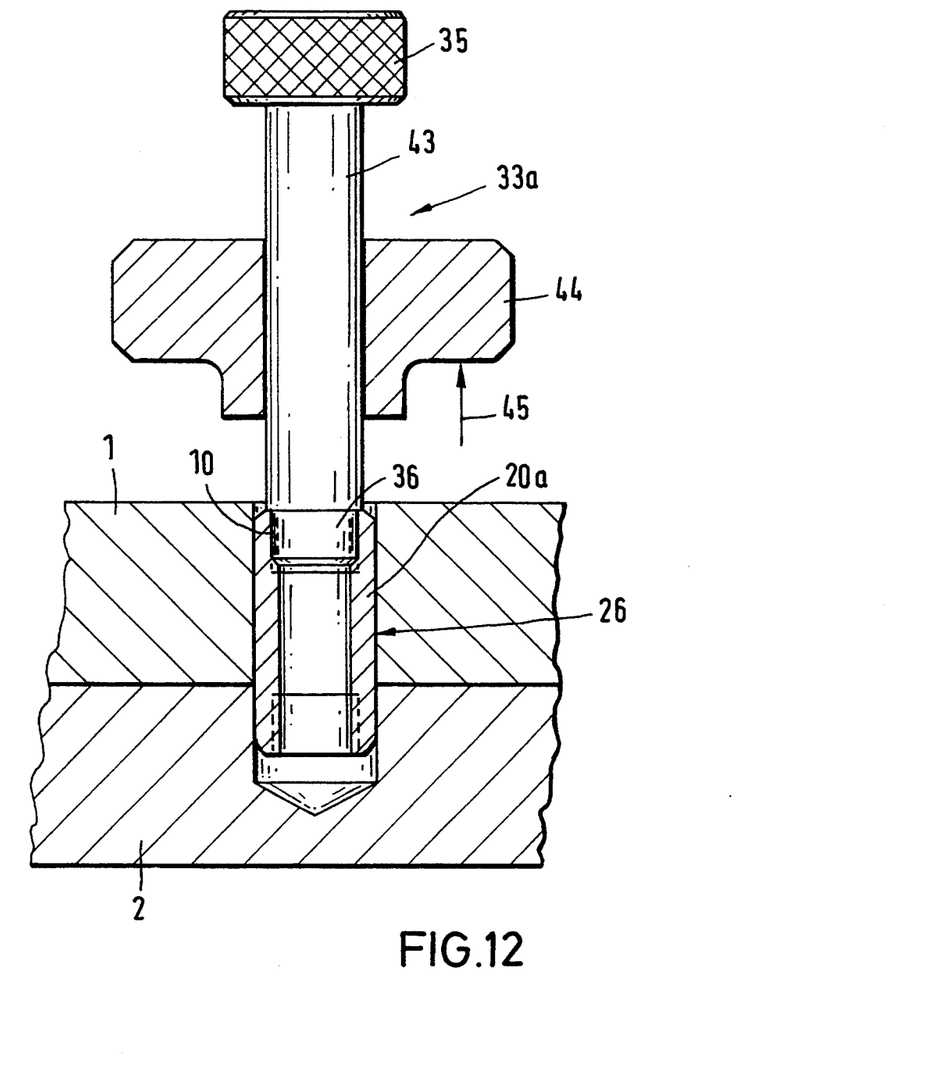
FIG. 12 is an illustration similar to FIG. 11 of another embodiment of means of removing the device for positioning the component.

When a device 20a in accordance with the invention is inserted in a blind hole 26 as illustrated in FIGS. 11 and 12 on the other hand, a special device 33 must be employed to remove it. Device 33 has a threaded rod 34 and head 35, with one section 36 of thread engaging the thread inside device 20a.

Threaded rod 34 also engages a thread 37 inside an impactor 39 that is applied against a surface 40 of a component 1 around blind hole 26. Impactor 39 has a cavity 41 into which device 20a can be inserted by rotating threaded rod 34. Impactor 39 is maintained relatively stationary by an appropriately knurled annular handle 42. Rotating a knob 35 will extract device 20a.

The device 33a illustrated in FIG. 12 for removing a device 20a from a matching blind hole 26 in component 1 or 2 also has a threaded section 36 that engages a thread 10 inside device 20a. Cast in one piece with hole 26 on the other hand is a smooth and unthreaded bolt 43 that surrounds an impactor 44. Impactor 44 is forced forward in the direction indicated by arrow 45 by hand or with an appropriate tool and preferably engages a threaded head 35. This is another simple way of extracting device 20a from hole 26.

Figure 13:
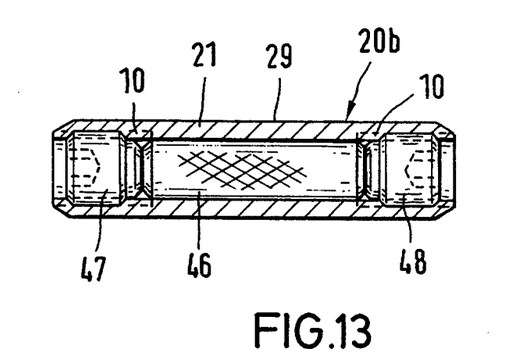
FIG. 13 is a longitudinal section through another embodiment of a device for positioning components.

One particular device 20b has a resilient rod 46 inserted in axial bore 29. Rod 46 can be made of rubber or of any material, neoprene for example, with a Shore hardness approximately 60.

Figure 14:
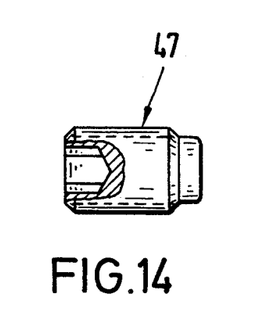
FIG. 14 is a partly broken top view of a threaded pin for use in a device like that illustrated in FIG. 13.
Figure 15:
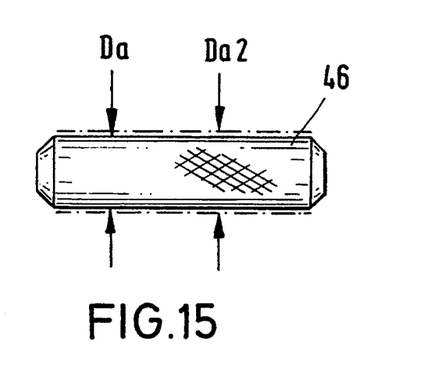
FIG 15 is a top view of a resilient rod for use in a device like that illustrated in FIG. 13.

A threaded pin 47 or 48 in screwed into the inside thread 10 at each end. The pins exert force on rod 46, elongating its outside diameter Da (FIG. 15) to Da2 (represented by the dot-and-dash lines). The force also expands cylindrical jacket 21 which enters an interlocking or frictional engagement with the wall of the bore.

Figures 16, 17:
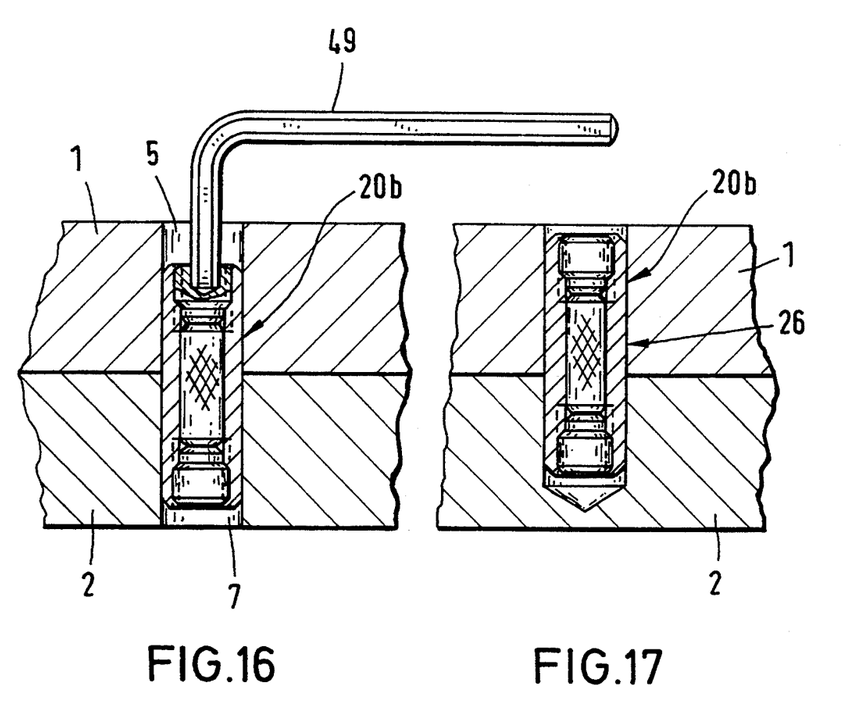
FIG. 16 is a transverse section through part of two components with an device like the one illustrated inn FIG. 13 inserted for positioning the components ready for use.
FIG. 17 is a transverse section through two components with the device illustrated in FIG. 13 inserted in another position ready to use.

The device has all the advantages of the pin 3i illustrated in FIG. 2a, although it is much less expensive to manufacture. It can be inserted manually in holes that extend all the way or part-way and can be expanded with an inside-hexagon wrench 49 as illustrated in FIGS. 16 and 17. This approach to assembly eliminates the need to manufacture some components with compression hold and other with thrust fit. One type of fit of the aforesaid effectiveness will suffice.

The range of application for a device 2b is universal. It can be employed wherever extremely precise positioning is necessary originally and during repeated use. The device is particularly appropriate for punching tools with appropriate mechanisms, molds, instruments, and machinery as well as in other high-precision machining and machine building.

I claim:

1. An arrangement for positioning components particularly die or mold plates in shaping machinery, comprising: means for insertion in matching bores in said components and having a cylindrical jacket around an axial bore and a continuous through-running slot; an elastic rod having a longitudinal axis and thickness and inserted in said axial bore and subjected to force from at least one end for increasing the thickness of said elastic rod and widening said cylindrical jacket and thereby positioning said components; said axial bore of said jacket threaded at both ends for receiving threaded pins; said components having an elastic connection through said elastic rod and transverse to said longitudinal axis of said rod, said continuous through-running slot providing elasticity by widening an amount dependent on said force.

2. An arrangement as defined in claim 1, wherein said axial bore has an inside thread at each end for receiving a threaded pin.

3. An arrangement as defined in claim 2, wherein said threaded pin has an interior hexagon accommodating an interior-hexagonal wrench.

4. An arrangement as defined in claim 1, wherein said elastic rod is made of neoprene.

5. An arrangement for positioning components particularly die or mold plates in shaping machinery, comprising: means for insertion in matching bores in said components and having a cylindrical jacket around an axial bore and a continuous through-running slot; an elastic rod having a longitudinal axis and thickness and inserted in said axial bore and subjected to force from at least one end for increasing the thickness of said elastic rod and widening said cylindrical jacket and thereby positioning said components; said components having an elastic connection through said elastic rod and transverse to said longitudinal axis of said rod, said continuous through-running slot providing elasticity by widening an amount dependent on said force; said axial bore having an inside thread at each end for receiving a threaded pin; said threaded pin having an interior hexagon accommodating an interior-hexagonal wrench; said elastic rod being made of neoprene.

* * * * *